United States Patent
Quaresma et al.

(10) Patent No.: US 11,421,724 B2
(45) Date of Patent: Aug. 23, 2022

(54) FLUSH-BREAK BLIND FASTENER

(71) Applicant: MONOGRAM AEROSPACE FASTENERS, INC., Los Angeles, CA (US)

(72) Inventors: Jerry Quaresma, La Mirada, CA (US); David Littlejohn, Upland, CA (US)

(73) Assignee: MONOGRAM AEROSPACE FASTENERS, INC., Los Angeles, CA (US)

( * ) Notice: Subject to any disclaimer, the term of this patent is extended or adjusted under 35 U.S.C. 154(b) by 330 days.

(21) Appl. No.: 16/537,762

(22) Filed: Aug. 12, 2019

(65) Prior Publication Data

US 2020/0049185 A1 Feb. 13, 2020

Related U.S. Application Data

(60) Provisional application No. 62/717,117, filed on Aug. 10, 2018.

(51) Int. Cl.
*F16B 19/10* (2006.01)

(52) U.S. Cl.
CPC ...... *F16B 19/1054* (2013.01); *F16B 19/1063* (2013.01); *F16B 19/10* (2013.01)

(58) Field of Classification Search
CPC ........... F16B 13/061; F16B 19/1054; F16B 19/1063; F16B 19/1072; F16B 19/1081; F16B 19/109; F16B 19/10
USPC ............................................. 411/39, 43, 44
See application file for complete search history.

(56) References Cited

U.S. PATENT DOCUMENTS

| | | | |
|---|---|---|---|
| 2,787,185 A | 4/1957 | Rea | |
| 3,129,630 A | 4/1964 | Wing | |
| 3,253,495 A | 5/1966 | Orioff | |
| 3,262,353 A | 7/1966 | Waeltz | |
| 3,277,771 A * | 10/1966 | Reynolds | F16B 19/1063 411/39 |
| 3,702,088 A | 11/1972 | Schmitt | |
| 4,033,222 A | 7/1977 | Wilson | |
| 4,127,345 A | 11/1978 | Angelosanto | |
| 4,312,613 A | 1/1982 | Binns | |
| 4,627,775 A | 12/1986 | Dixon | |
| 4,659,271 A * | 4/1987 | Pratt | F16B 19/1063 411/43 |
| 4,659,272 A | 4/1987 | Pratt | |
| 4,747,202 A * | 5/1988 | Beals | F16B 19/1063 29/437 |

(Continued)

FOREIGN PATENT DOCUMENTS

GB 1413592 A 11/1975

OTHER PUBLICATIONS

European Patent Office, European Search Report, EP 17160089 dated Jan. 18, 2018.

(Continued)

*Primary Examiner* — Roberta S Delisle
(74) *Attorney, Agent, or Firm* — McDonald Hopkins LLC (57) ABSTRACT

The fastener includes a bolt, a nut, a sleeve, and a drive nut. The drive nut interfaces with the nut. The bolt is disposed through the nut, sleeve, and drive nut. The bolt comprises one or more threaded portions and a non-threaded portion. The fastener breaks-off at the non-threaded portion during installation. The installed fastener comprises a recess-free, flush surface with a workpiece.

16 Claims, 8 Drawing Sheets

(56) References Cited

U.S. PATENT DOCUMENTS

| | | | | |
|---|---|---|---|---|
| 4,772,167 | A | * | 9/1988 | Beals ............... F16B 19/1063<br>411/43 |
| 5,030,050 | A | | 7/1991 | Auriol |
| 5,256,017 | A | | 10/1993 | Smirnov |
| 5,350,264 | A | * | 9/1994 | Stencel ............ F16B 19/1063<br>411/38 |
| 5,498,110 | A | | 3/1996 | Stencel |
| 7,033,120 | B2 | * | 4/2006 | Hufnagl ............ F16B 19/1054<br>411/283 |
| 7,150,594 | B2 | * | 12/2006 | Keener ............. F16B 19/1054<br>411/34 |
| 8,322,015 | B2 | | 12/2012 | Pratt |
| 8,348,566 | B2 | | 1/2013 | Pratt |
| 9,212,678 | B2 | * | 12/2015 | Pratt ............... F16B 19/1054 |
| 2002/0031415 | A1 | * | 3/2002 | Cosenza ............ F16B 19/1054<br>411/34 |
| 2005/0201845 | A1 | | 9/2005 | Keener |
| 2006/0062650 | A1 | | 3/2006 | Keener |
| 2009/0016842 | A1 | | 1/2009 | Auriol |
| 2011/0010919 | A1 | * | 1/2011 | Pratt ............... F16B 19/1063<br>29/525.01 |
| 2011/0182689 | A1 | | 7/2011 | Avetisian |
| 2012/0263556 | A1 | * | 10/2012 | Pratt ............... F16B 19/1054<br>411/361 |
| 2013/0061452 | A1 | * | 3/2013 | Pratt ............... F16B 19/1072<br>29/525.02 |
| 2014/0044498 | A1 | * | 2/2014 | Hufnagl ............ F16B 19/1072<br>411/43 |
| 2015/0010370 | A1 | * | 1/2015 | Pratt ............... F16B 19/1063<br>411/43 |
| 2017/0268556 | A1 | | 9/2017 | Koontz |
| 2020/0049185 | A1 | | 2/2020 | Quaresma |

OTHER PUBLICATIONS

International Searching Authority, U.S. Patent Office, International Search Report and Written Opinion for PCT/US2019/046094, 12 pages, dated Jul. 16, 2020.

* cited by examiner

FLUSH-BREAK BLIND FASTENER

CROSS-REFERENCE TO RELATED APPLICATIONS

The present application claims priority to and the benefit of U.S. Provisional Patent Application No. 62/717,177 titled "FLUSH-BREAK BLIND FASTENER" filed on Aug. 10, 2018, the disclosure of which is incorporated herein by reference in its entirety.

TECHNICAL FIELD

This disclosure relates to a fastener, and, more specifically, to a recess-free blind fastener that breaks flush with a workpiece.

BACKGROUND

Rivets and other types of fasteners are used in manufacturing to hold workpieces together. Such rivets may hold together metal or other materials and may be high-strength fasteners. In some manufacturing operations, apertures are drilled through workpieces and then rivets are installed in the apertures.

Blind fasteners are traditionally used in the aircraft industry. Such fasteners generally include a nut, a bolt and a sleeve. The nut has a body with a threaded axial bore therethrough. A bolt is threaded in the nut body. A hollow cylindrical sleeve surrounds the bolt between the nut and a head of the bolt. In installation, the fastener is aligned in holes in workpieces. As the bolt is drawn through the bore of the nut, the sleeve is pushed by the bolt head and is deformed against the workpieces thus locking the fastener in position.

Once locked, a portion of the bolt above the workpieces is removed and discarded. This portion typically breaks off from the remainder of the bolt. The surface of the workpiece typically has a resulting protruding tip, pintail, recesses, or other formation so that the installed fastener and the workpiece are not flush. It may be necessary to conduct further operations to make the workpiece and the fastener flush. For example, this may involve shaving off the protruding tip, pintail, or other formation of the remaining fastener after installation which entails considerable man hours or additional automated processes. In addition, the shaving off of the remaining fastener involves repetitive motions that may be required for many fasteners, particularly on large aircrafts. This repetitive motion may contribute to fatigue, human errors, or health and safety concerns if done improperly. Furthermore, each shaving process may allow for increased potential damage to a workpiece, such as an aircraft.

For these and other reasons, there is a need for a fastener which operatively breaks flush with a workpiece and does not result in surface formations. Moreover, there is a need for a more efficient fastener, system, and methods for installing a fastener.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

The present disclosure describes a blind fastener. The blind fastener includes a nut comprising a body, a first end, and a second end, wherein the body comprises an internally threaded bore having a first diameter, and the second end comprises a head comprising a wrenching surface, and a bore comprising a second diameter, wherein the first diameter is different from the second diameter; a bolt comprising a bolt head, a first threaded portion, a second threaded portion, and a non-threaded portion, wherein the non-threaded portion is disposed between the first threaded portion and the second threaded portion, and wherein the first threaded portion comprises different dimensions than the second threaded portion; and a sleeve disposed between the bolt head and the nut; wherein the bolt passes through the sleeve and the nut. In another aspect, the bolt further may comprise a groove disposed between the non-threaded portion and the second threaded portion. The groove may comprise a first wall and a second wall. The first wall may be generally planar and the second wall extends at an angle from the first wall. The angle may generally be between twenty-five degrees and forty degrees. In at least one example, the angle is generally thirty degrees. As described herein, the nut may comprise a shoulder separating the internally threaded bore and the bore of the head. The shoulder operatively stops the bolt from advancing beyond a predetermined position. The blind fastener may include a drive nut comprising a bore and an engaging surface operatively contacting the wrenching surface. The blind fastener may additionally or optionally include an insert operatively disposed between the sleeve and the bolt.

Also described herein is a fastener comprising a nut, a bolt, a sleeve, and a drive nut, wherein the drive nut comprises a knurled surface that interfaces with the nut, wherein the drive nut comprises a stop feature that prevents the bolt from advancing beyond a predetermined position, and wherein the bolt comprises a non-threaded portion that is operatively exposed during installation. The nut may comprise an engaging surface that interfaces with the knurled surface. The engaging surfaces may be free of recesses or protrusions. The bolt operatively breaks off at the non-threaded portion during installation. The non-threaded portion further comprises an annular break groove that operatively provides a weakened portion for fracturing the bolt at a desired position.

Described is a method including providing a blind fastener comprising a bolt, the bolt comprising a first threaded portion, a second threaded portion, and a non-threaded portion, wherein the non-threaded portion is disposed between the first threaded portion and the second threaded portion, and wherein the first threaded portion comprises different dimensions than the second threaded portion; breaking off the bolt when the non-threaded portion is exposed; and wherein the installed fastener after breaking off the bolt comprises a recess-free, flush surface. The method may further comprise grasping the first threaded portion and applying force to the first threaded portion until breaking of the bolt. The method may further comprise providing a drive nut, wherein the blind fastener further comprises a nut, and wherein the drive nut interfaces with the nut. The method may further comprise providing an installation tool comprising a head, wherein the blind fastener further comprises a nut, and wherein the head interfaces with the nut.

The foregoing embodiments are merely exemplary of some of the aspects of the system. Additional features and elements may be contemplated and described herein. Also, features from one of the foregoing embodiments may be combined with features from any of the other foregoing embodiments.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Furthermore, the terms "user," "installer," "technician," and the like are employed interchangeably throughout the subject specification, unless context suggests otherwise or warrants a particular distinction among the terms. It is noted that such terms may refer to human entities or automated components. As such, embodiments may describe a user action that may not require human action.

As used herein, a fastener may refer to various types of rivets, screws, bolts, or the like. Such fasteners may comprise metals, plastics, or other materials. For example, fastener may refer to a cylindrical rivet comprising a metal body (e.g., aluminum, steel, etc.). Moreover, embodiments may refer to a specific type of fastener for simplicity of explanation. As such, disclosed aspects may be applicable to various other types of fasteners.

Blind fasteners may be used where there is limited operating room, to reduce installation costs, or to reduce installation time in comparison to two-piece non-blind fasteners. Blind fasteners are more readily and cost effectively adapted to automated or robotic installation than would be a two-piece system. For these and other reasons, blind fasteners are considered for non-typical applications wherein access is available but productivity demands and cost concerns drive the use of automation.

A blind fastener may comprise a threaded fastener capable of one-sided installation. To install a blind fastener, a nut and bolt are positioned within an aperture. Some traditional blind fasteners rely on recesses, often cruciform, within the threaded body portion of the fastener to restrain rotation of that component during the installation procedure. Some of these fasteners have a variable "break-off" position of the bolt component relative to the fastener body which is intended to sit flush with the workpiece, such as an aircraft component once installed. When installed, the variable break-off position results in surface features, such as protrusions, pin tails, recesses, or the like. Any portion of the installed blind fastener that protrudes above the surface of the workpiece is removed or reduced by shaving, milling, or similar process to meet aerodynamic stipulations. This additional installation step adds cost and time.

When the fastener results in a recess or sub-flush screw position, aerodynamics can be adversely affected due to parasitic drag created by the void. The inherent void of the recesses relied upon for installation and the variable sub-flush screw position combine to compromise aerodynamics and add labor in terms of preparation for paint and do not present the same opportunity for a relatively seamless finish. For example, when an installed fastener results in a sub-flush finish with a work piece, a user may be required to fill the sub-flush area with a filler material (e.g., resin, epoxy, etc.) or apply multiple layers of paint. In another aspect, the degree to which a breakoff is sub-flush may compromise the integrity of a joint. For instance, the further the breakoff is from the flush surface, the weaker or more compromised the joint may be.

Described embodiments may provide both recess-free and flush break threaded blind fasteners. Such fasteners may comprise aluminum or other materials. Embodiments include a non-threaded area of the bolt at a break-off location to facilitate a smoother cosmetic finish. The aspect of arresting the screw rotation may be accomplished by means of interference with a shoulder in the nut element. In another example, a drive nut may comprise a shoulder or other stop structure. It is further noted that an installation tool nose adapter may comprise a shoulder that may arrest movement for break off. In another aspect, the installation tool nose may comprise a textured surface, such as a knurled or breaded surface as described herein.

Exemplary fasteners may include a break groove that fractures a bolt after or during installation. The break groove and the non-threaded portion of the bolt may allow for consistent flush break-off to eliminate secondary shaving, milling or grinding operations, as well as provide reduced cost, reduced time, and improved appearance when painting a workpiece. In another aspect, a flush finish may reduce or eliminate need for filling a void with a filler material or applying multiple layers of paint to a void. Moreover, the drive nut may engage with a shoulder or exposed portion of the nut without engaging with any recesses. This may arrest rotation of the nut during installation. For instance, the drive nut may comprise a knurled or ribbed end that engages the exposed portion of the nut. As such, the exposed portion of the nut may be generally free of any recesses. In examples, the elimination of recesses results in increased material in the head of the nut. This increase in material may reduce potential for fracturing, improve strength of fasteners, increase applications for fasteners, or otherwise result in an improved fastener. For instance, the increased strength of the nut may allow fasteners of particular materials (e.g., aluminum, etc.) to be utilized to fasten parts that experience increased lap sheer strength. Utilization of disclosed fasteners in high stress areas where sheer strength is required may reduce the overall cost as less expensive or difficult to handle materials may be replaced or avoided.

Figure 1:
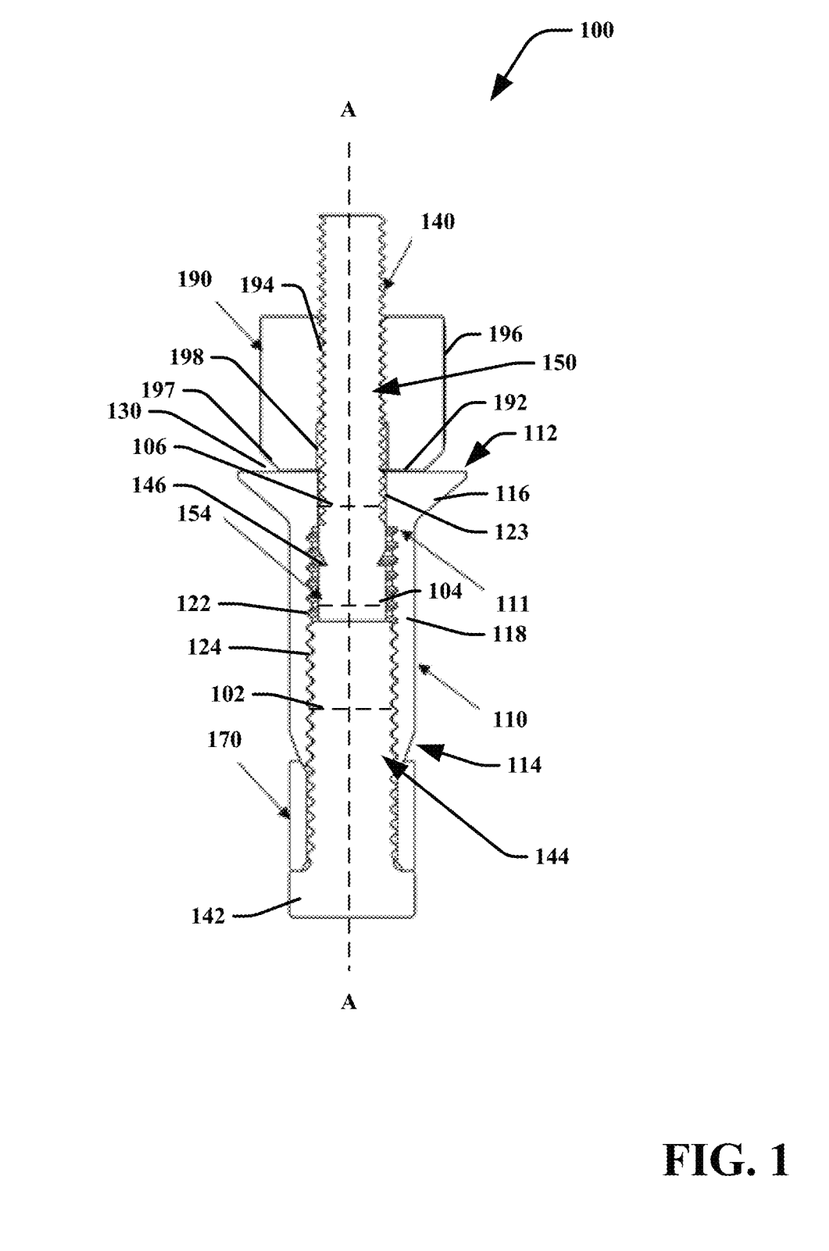
FIG. 1 is a cross-sectional view of a blind fastener in accordance with the present disclosure.

Turning to FIG. 1, there is a fastener 100 that may provide for a recess-free, flush break when installed in a workpiece. The fastener 100 may comprise a blind fastener and may comprise aluminum, steel, or other materials. It is noted that the various components of the fastener 100 may comprise the same or different material.

Figure 2:
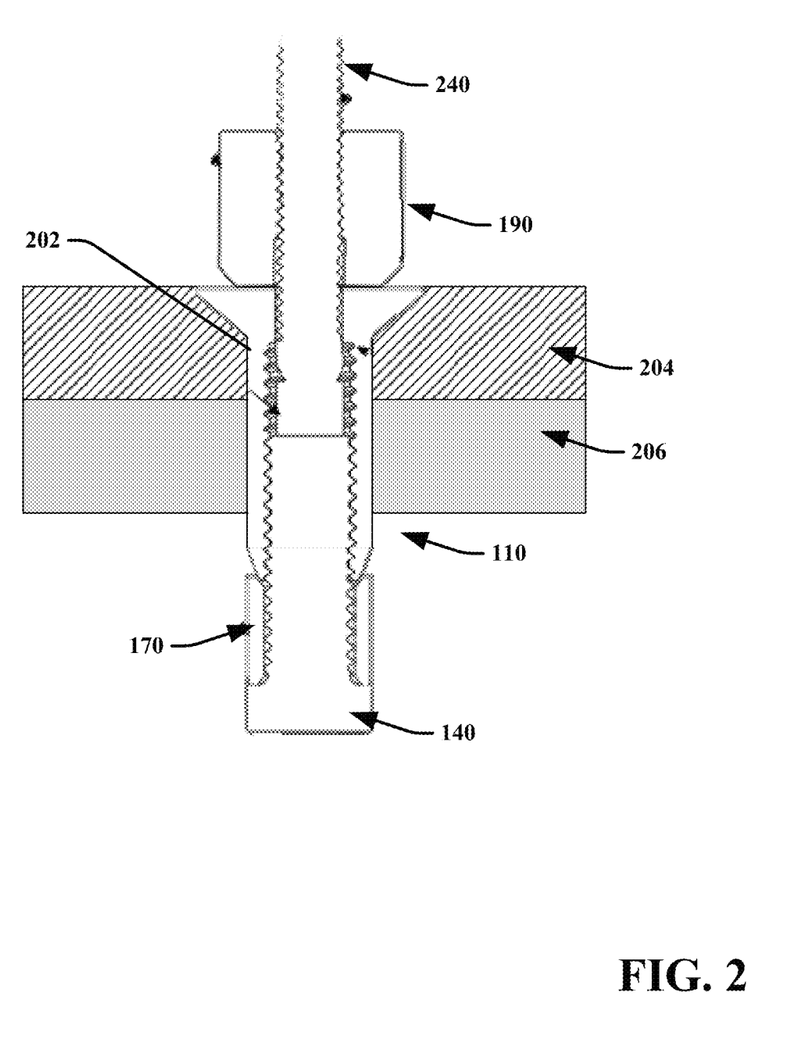
FIG. 2 is a cross-sectional view of the blind fastener of FIG. 1 disposed in a workpiece in accordance with the present disclosure.
Figure 3:
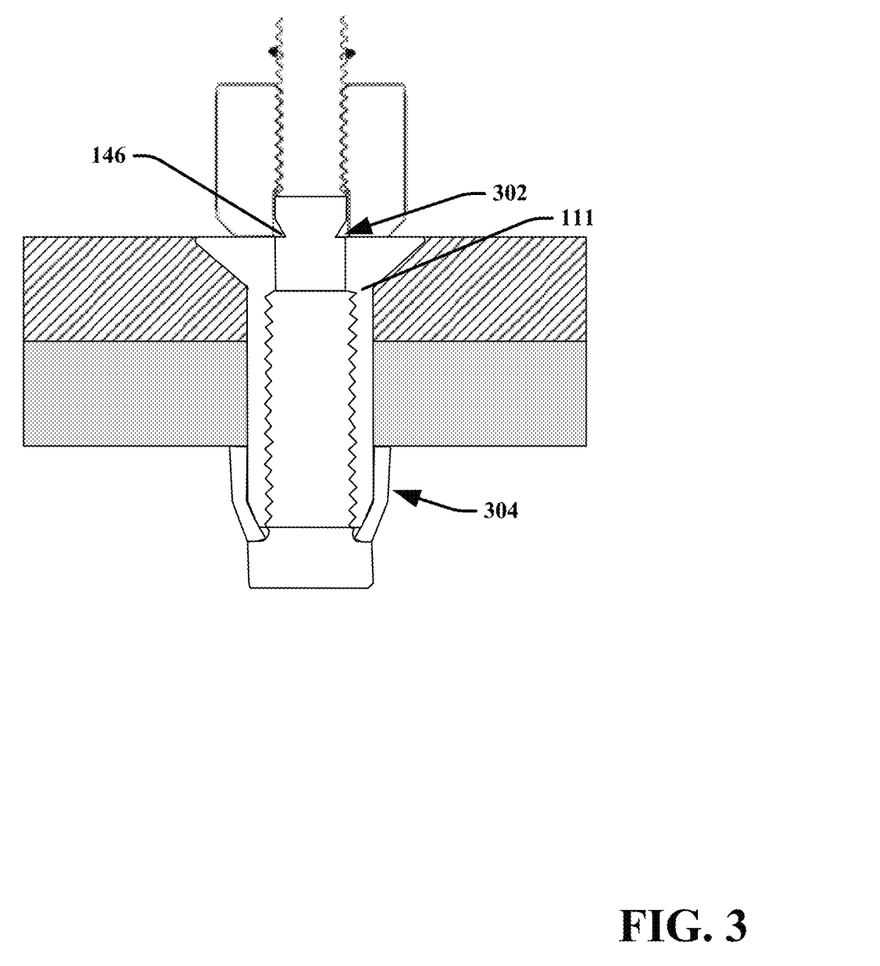
FIG. 3 is a cross-sectional view of the blind fastener of FIG. 1 disposed in a workpiece with a deformed sleeve in accordance with the present disclosure.
Figure 4:
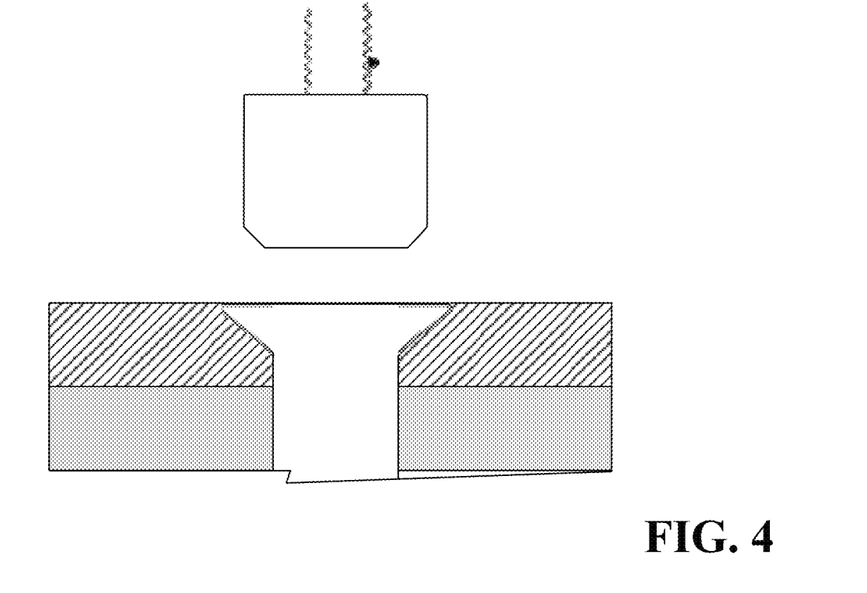
FIG. 4 is a cross-sectional view of the blind fastener of FIG. 1 disposed in a workpiece with a broken off lead screw and drive nut in accordance with the present disclosure.

Fastener 100 generally includes nut 110, bolt 140, sleeve 170 and drive nut 190. Fastener 100 defines longitudinal axis A and is generally symmetric about longitudinal axis A. Nut 110 may comprise a body 118 with first end 112 and second end 114. The body 118 may be generally cylindrical extending between the first end 112 and the second end 114. First end 112 includes head 116. Head 116 may be generally frustoconical to allow for installation in a countersunk aperture. Head 116 may comprise a central bore 123 that may be non-threaded. Head 116 may comprise a wrenching surface 130 that may be exposed when the fastener is installed in a workpiece, as shown in FIGS. 2-4. In an aspect, the wrenching surface 130 may be generally level to provide a flush surface with a workpiece once installed. Second end 114 may be tapered, angled, or otherwise shaped to engage with sleeve 170. In an example, the second end may comprise a generally frustoconical shape. The shape of the second end 114 may allow for sleeve 170 to be deformed during installation, as described herein.

The body 118 may comprise a bore 122. Bore 122 may comprise threads 124. Threads 124 may correspond and cooperate with first threaded portion 144 of the bolt 140. Bolt 140 includes head 142, the first threaded portion 144, recess or break groove 146, second threaded portion 150 and non-threaded portion 154. Break groove 146 is positioned between the second threaded portion 150 and the non-threaded portion 154. In at least one embodiment, the break groove 146 is disposed within the non-threaded portion 154 such that a first external surface of the bolt 110 above the break groove 146 is non-threaded and a second external surface of the bolt 110 below the break groove 146 is non-threaded. First threaded portion 144 is positioned between the non-threaded portion 154 and the head 142.

It is noted that the second threaded portion 150 may extend above the drive nut 190. In some embodiments, a portion of the second threaded portion 150 extending above the drive nut 190 may not comprise threads and may comprise a wrenching portion, shaft, or the like.

Drive nut 190 may comprise an engaging surface 192, internally threaded portion 194 and wrenching surface 196. It is noted that the drive nut 190 may be hexagonal in shape, cylindrical or otherwise configured for tool engagement. Engaging portion 192 may comprise a terminal end of a frustoconical portion 197. The engaging portion 192 may operatively interface with wrenching surface 130 of the nut 110 to rotationally constrain drive nut 190 and nut 110 together. In an aspect, the engaging portion 192 may be a knurled surface of straight, angled or crossed lines on the surface. The knurled surface may prevent rotation of the nut 110 as it engages with the wrenching surface 130 as described herein.

According to at least one embodiment, the first threaded portion 144 of the bolt 110 may comprise a major diameter 102. The major diameter 102 may be the same or slightly smaller than the diameter of bore 122 to allow the first threaded portion to interface with threads 124 of the bore 122. In another aspect, the major diameter 102 may be larger than a diameter 103 of bore 123. This may act as a stop as the first threaded portion 144 may contact a shoulder 111 disposed within the bore 122. The shoulder 111 prevents the bolt 110 from advancing once the shoulder 111 and first threaded portion 144 come into contact.

A diameter 104 of the non-threaded portion 154 may be smaller than the major diameter 102 and may be equal to or slightly smaller than head bore diameter 106. This may allow the non-threaded portion 154 to pass through the bore 123 during installation. In an aspect, the non-threaded portion 154 may tightly fit in the bore 123 such that the finish after installation is generally flush and smooth.

Turning now to FIGS. 2-5 these are exemplary views of the fastener 100 during various stages of installation in an aperture 202 formed through workpieces 204 and 206. Fastener 100 is disposed within the aperture 202. The aperture 202 is provided as generally cylindrical with a frustoconical portion that operatively cooperates with the shape of nut 110.

An installation tool or wrench adapter (not shown) operatively drives the bolt 140 at a lead pin 240 portion. The lead pin 240 extends above the drive nut 190 on a non-blind side of installation. The installation tool operatively prevents the drive nut 190 from rotating. The drive nut 190 contacts the nut 110, such as at the engaging surface 192, as shown in FIG. 1, operatively interfacing with wrenching surface 130 of the nut 110 to rotationally constrain drive nut 190 and nut 110 together. As described herein, the engaging portion 192 may be a knurled surface to prevent or stop the nut 110 from rotating. This may allow the sleeve 170 to be deformed and form a footprint 304 in the back side of the structure providing preload, as shown in FIG. 3.

Figure 9:
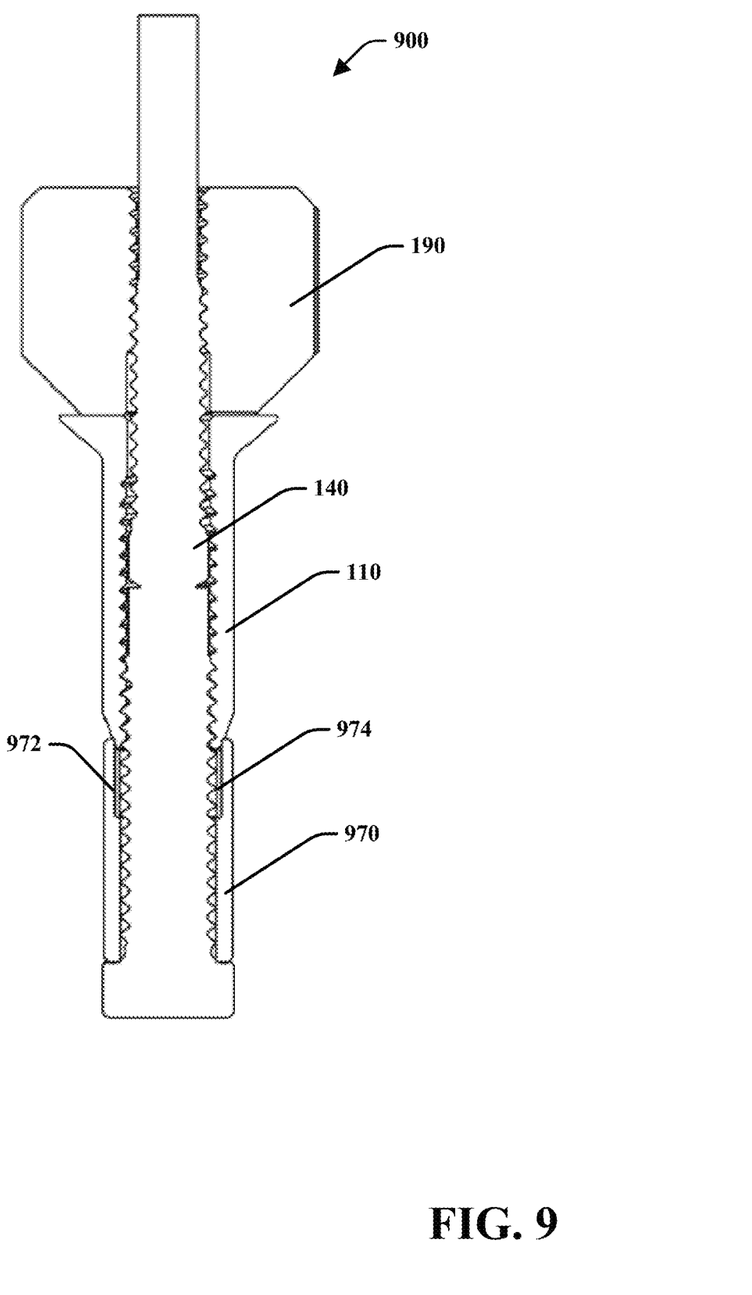
FIG. 9 is a cross-sectional view of a blind fastener with a sleeve insert in accordance with the present disclosure.

FIG. 9 illustrates an exemplary embodiment of a blind fastener 900 that includes a sleeve 970 that may comprise a cut out, recess, or other space 972 for receiving an insert 974. The blind fastener 900 may include the same or similar components as the blind fastener 100, such as a nut 110, bolt 140, and drive nut 190. The insert 972 may comprise plastic or other material. The insert 972 may assist in formation of the footprint 304 during installation. The functioning of such an insert 972 may comprise a tensile strength generally less than the tensile strength of the sleeve 970. For example, the tensile strength of the insert 972 may be about 5% to 30% of the tensile strength of the sleeve 970. The dimensions of the insert 972 may be varied such that the insert 972 is completely or partially disposed within the cavity. It is further noted that the insert 972 may comprise a monolithic construction or may consist of two or more pieces.

Figure 5:
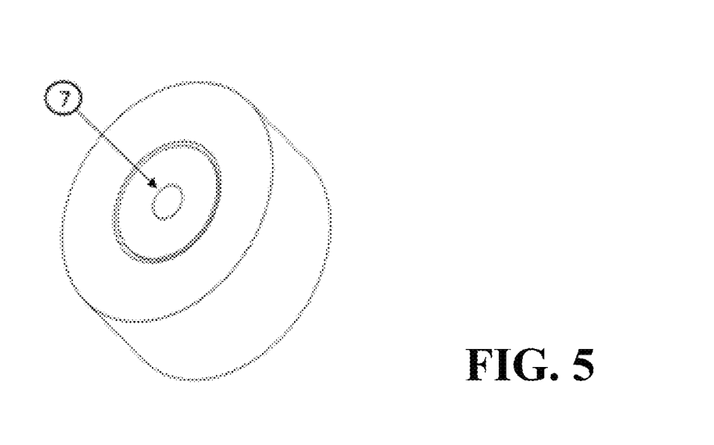
FIG. 5 is a cross-sectional, perspective view of the blind fastener of FIG. 1 installed in a work piece with a recess-free, flush surface in accordance with the present disclosure.

As described herein, bolt 140 may comprise two or more thread sizes with the smaller thread contributing to a reduced area 302 where exposed at the nut head upon torsional break-off at the completion of the installation process. During installation, the bolt 140 travels towards the installation tool and bottoms out on the nut shoulder 111. The non-threaded area 154 is then exposed and breaks off at the break groove 146 allowing a smooth shank, exposed with no thread profile, to provide an improved flush appearance as shown in FIGS. 4 and 5. In FIG. 4, the drive nut 190 and lead pin 240 is broken off from the other portions of fastener 100. FIG. 5 shows a perspective, cross-sectional view of the fastener 100 installed in the workpieces.

Figure 7:
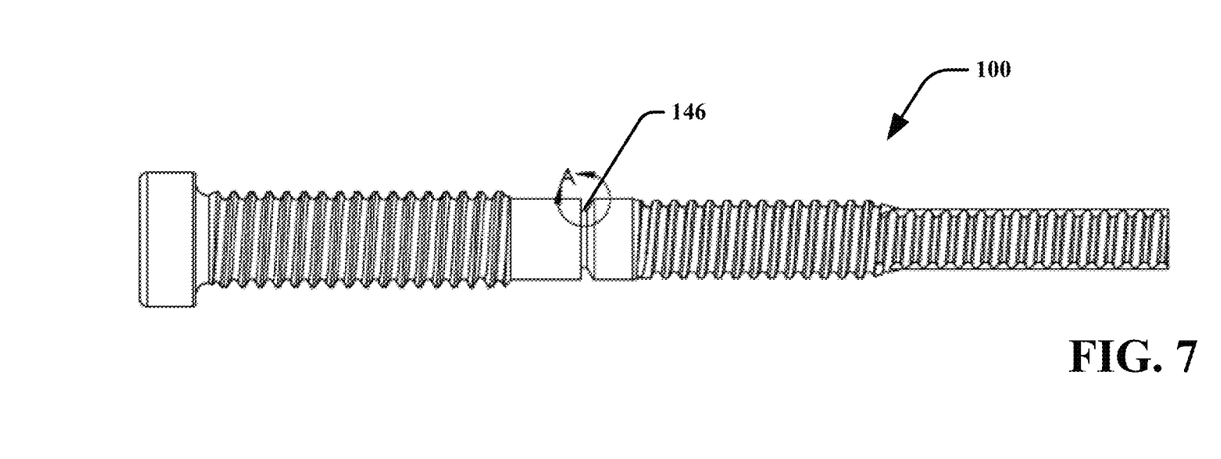
FIG. 7 is a side view of the blind fastener of FIG. 1 in accordance with the present disclosure.
Figure 8:
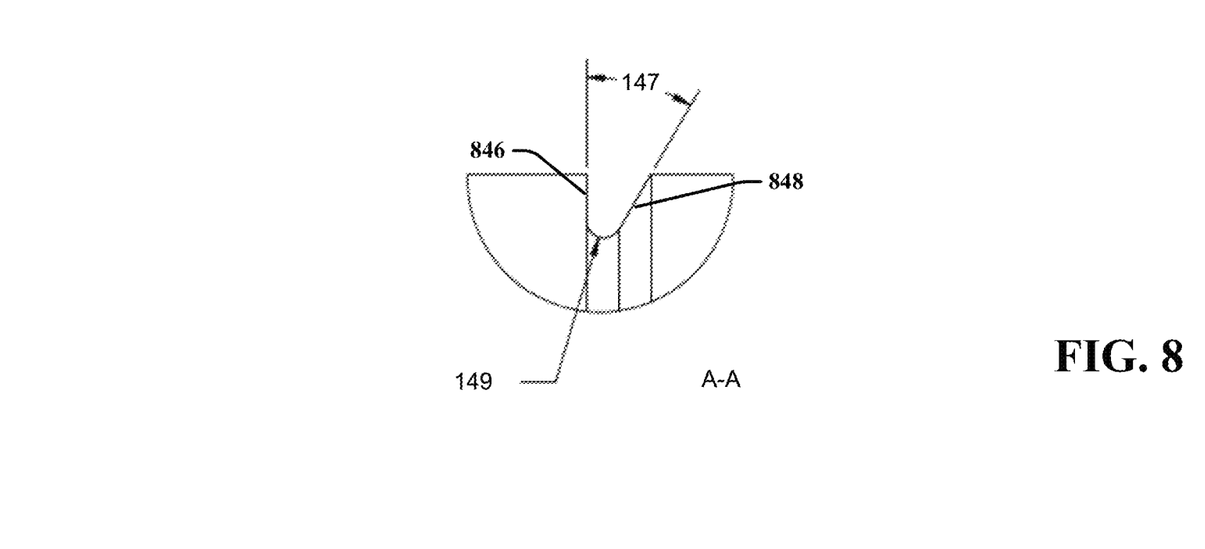
FIG. 8 is an enlarged view of a break groove of the blind fastener of FIG. 7 in accordance with the present disclosure.

Turning to FIGS. 7 and 8, there are additional views of the break groove 146. In examples, the break groove 146 may be cut at an angle 147 defined between a first wall 846 and a second wall 848. The angle 147 may be between m and n degrees, where m and n are numbers. For instance, m may be 10, 15, 20, 25, 30, etc. In another example, n may be 15, 20, 25, 30, 35, 40, etc. In at least one example, the angle 147 may be generally 30 degrees. In some embodiments, 30 degrees has shown to produce unexpectedly improved results that result in clean or flush breaks during the installation. In another aspect, the first wall 846 may be generally planar or flat relative a work piece when installed and the second wall 848 may extend at angle 147 from the first wall 846. It is further noted that the vertex 149 between the first side 846 and the second side 848 may be curved, chamfered, or otherwise shaped.

It is noted that some embodiments may include a drive nut comprising a stop feature, in addition to or as an alternative to the shoulder 111. This may allow the throw-away portion of the fastener to provide a stop. For instance, the drive nut 190 may comprise a shoulder disposed therein. The shoulder may stop advancement of the bolt 140 such that the bolt cannot further advance. In an aspect, the shoulder may stop the bolt 140 when the non-threaded portion 154 is exposed. The bolt 140 may break off with a flush, recess-free finish.

Figure 10:
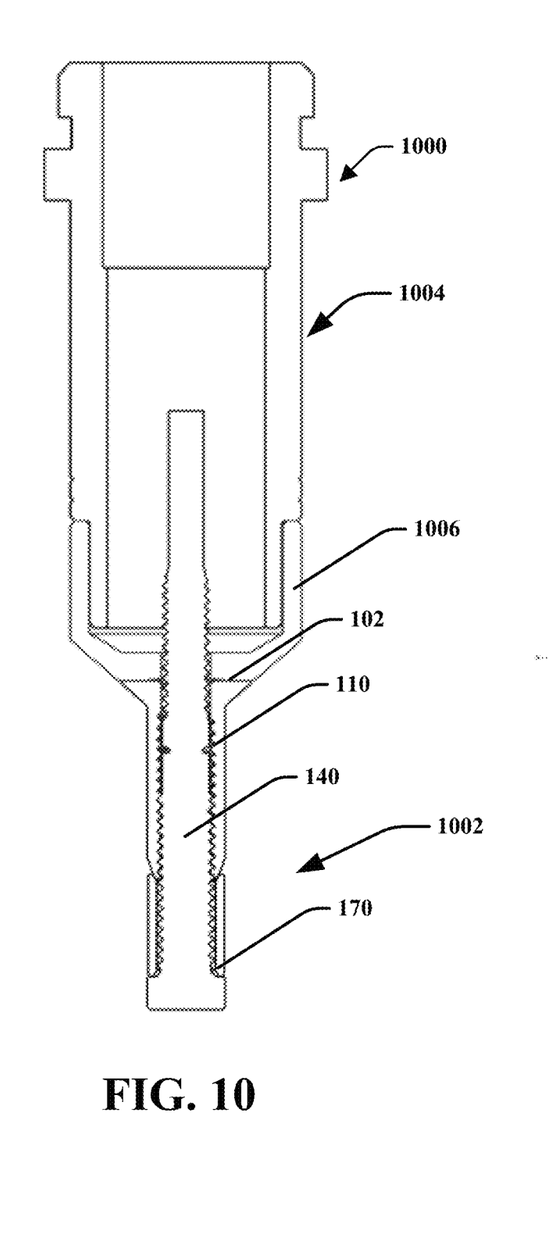
FIG. 10 is a cross-sectional view of a blind fastener without a drive nut.
Figure 11:
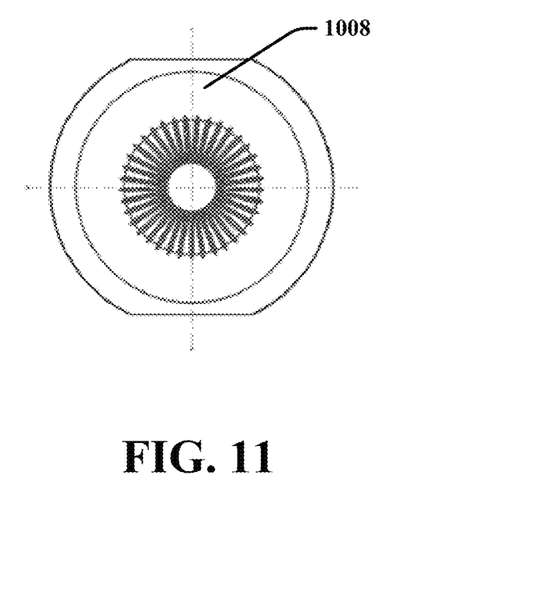
FIG. 11 is a top view of an installation tool adaptor.

Turning to FIGS. 10-11, there is a system 1000 comprising an installation tool 1004 and a blind fastener 802. It is noted that the blind fastener 1002 may comprise the same or similar components as the blind fastener 100 or 900, such as a nut 110, bolt 140, and sleeve 170 or 970. Blind fastener 1002, however, does not comprise a drive nut. Instead, the installation tool 1004 may be coupled with or comprise a head 1006 adapted to interface with the bolt 140. For instance, the installation tool 1004 may include a surface 1008 that may be a knurled surface of straight, angled or crossed lines. The surface 1008 may comprise other knurls or other formations to prevent rotation of the nut 110 as it engages with the installation tool 1004 as described herein.

It is further noted that the head 1006 may comprise a stop feature, in addition to or as an alternative to the shoulder 111. This may allow the throw-away portion of the fastener to provide a stop. For instance, the head 1006 may comprise a shoulder disposed therein. The shoulder may stop advancement of the bolt 140. In an aspect, the shoulder may stop the bolt 140 when the non-threaded portion 154 is exposed. The bolt 140 may break off with a flush, recess-free finish.

Figure 6:
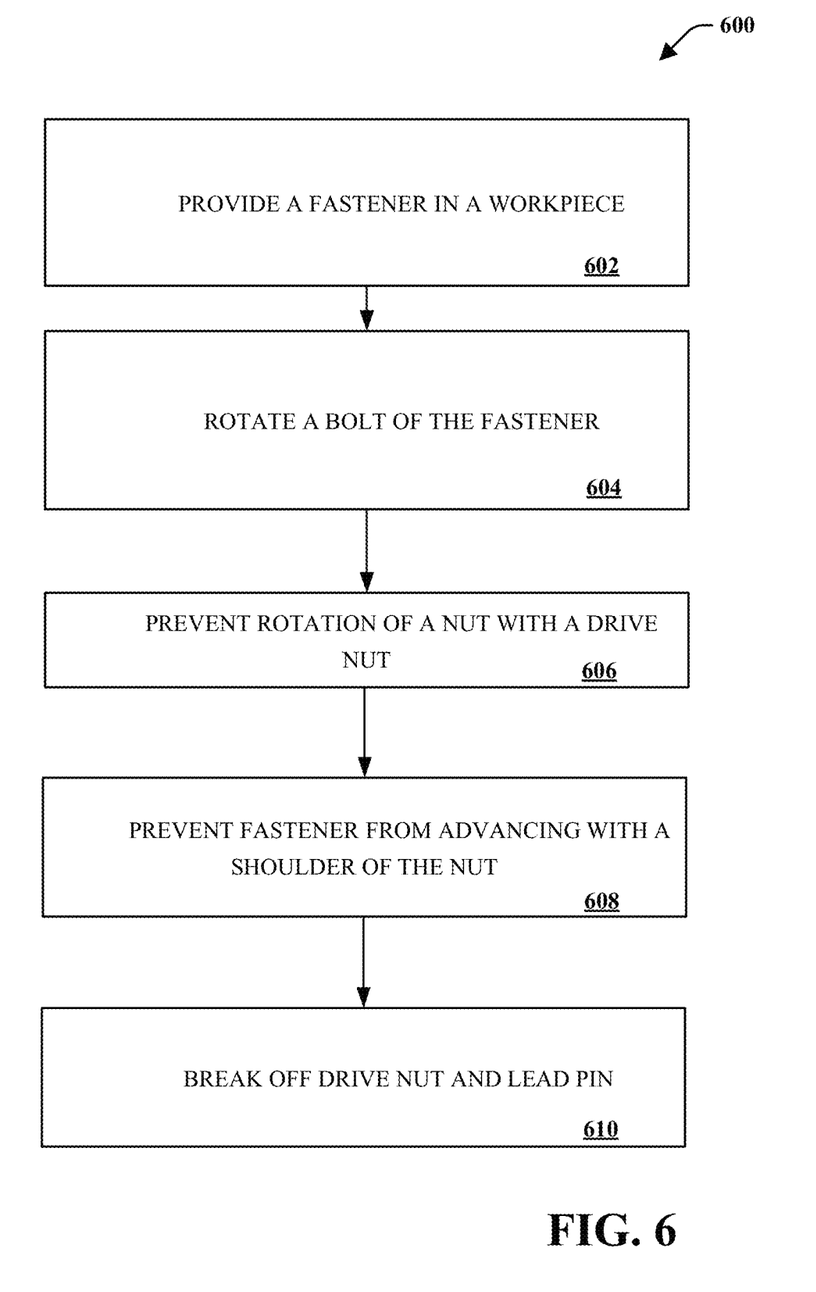
FIG. 6 is a method of installing a fastener in accordance with the present disclosure.

In view of the subject matter described herein, methods that may be related to various embodiments may be better appreciated with reference to the flowchart of FIG. 6. While the method(s) are shown and described as a series of blocks, it is noted that associated methods or processes are not limited by the order of the blocks unless context suggests otherwise or warrants a particular order. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

Turning now to FIG. 6, there is a method 600 that may provide for installation of a fastener as described herein. It is noted that an installation tool may be utilized for installing the fastener. The installation tool may be automated or may be applied by a user. The installed fastener may be similar or identical to embodiments described herein.

At 602, the method provides a fastener (e.g., fastener 100) in a workpiece. The fastener may comprise a bolt, a sleeve, a nut, and a drive nut. The bolt may comprise one or more threaded portions. The one or more threaded portions may comprise different thread dimensions. In another aspect, the bolt may comprise a non-threaded portion disposed between threaded portions. The bolt may additionally or alternatively comprise a break groove.

At 604, the method comprises rotating a bolt of the fastener. Rotation of the bold may comprise rotating a lead pin or screw via an installation tool. The installation tool may comprise an automated tool or a handheld tool.

At 606, the method comprises preventing rotation of the nut with the drive nut. For instance, the installation tool may prevent the drive nut from rotating. The drive nut may comprise a knurled surface that interfaces with the nut to prevent rotation of the nut.

At 608, the method comprises preventing the fastener from advancing with the use of a shoulder of the drive nut. The shoulder may be disposed within a bore of the nut. As the fastener passes through the bore, the shoulder may prevent a wider portion of the fastener from passing beyond the shoulder.

At 610, the method may include breaking off the drive nut and lead pin or screw. The portion of the fastener remaining in the workpiece may comprise a recess-free, flush surface with the workpiece.

While methods may be shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more users, mechanical machines, automated assembly machines (e.g., including one or more processors or computing devices), or the like.

What is claimed is:

1. A fastener comprising:
  a nut comprising a body, a first end, and a second end, wherein the body comprises an internally threaded bore having a first diameter, and the second end comprises a head comprising a wrenching surface, and a bore comprising a second diameter, wherein the first diameter is different from the second diameter;

a bolt comprising a bolt head, a first threaded portion, a second threaded portion, and a non-threaded portion, wherein the non-threaded portion is disposed between the first threaded portion and the second threaded portion, and wherein the first threaded portion comprises different dimensions than the second threaded portion;

a sleeve disposed between the bolt head and the nut; and an insert operatively disposed between the sleeve and the bolt;

wherein the bolt passes through the sleeve, the insert, and the nut.

2. The fastener of claim 1, wherein the bolt further comprises a groove disposed between the non-threaded portion and the second threaded portion.

3. The fastener of claim 2, wherein the groove comprises a first wall and a second wall.

4. The fastener of claim 3, wherein the first wall is generally planar and the second wall extends at an angle from the first wall.

5. The fastener of claim 4, wherein the angle is between generally twenty-five degrees and forty degrees.

6. The fastener of claim 4, wherein the angle is generally thirty degrees.

7. The fastener of claim 1, wherein the nut further comprises a shoulder separating the internally threaded bore and the bore of the head.

8. The fastener of claim 7, wherein the shoulder operatively stops the bolt from advancing beyond a predetermined position.

9. The fastener of claim 1, further comprising a drive nut comprising a bore and an engaging surface operatively contacting the wrenching surface.

10. A fastener comprising:

a nut, a bolt, a sleeve, and a drive nut, wherein the drive nut comprises a knurled surface that interfaces with the nut and the nut, the sleeve, and the drive nut coaxially receive the bolt, wherein the drive nut comprises a stop feature that prevents the bolt from advancing beyond a predetermined positon, and wherein the bolt comprises a non-threaded portion with an annular break groove disposed within the non-threaded portion and wherein the non-threaded portion is operatively exposed during installation so that the bolt fractures with a flush, recess-free finish relative to the nut when the stop feature is engaged.

11. The fastener of claim 10, wherein the nut comprises an engaging surface that: (i) is free of recesses or protrusions and (ii) interfaces with the knurled surface.

12. The fastener of claim 10, wherein the annular break groove is initially positioned within the nut and wherein a diameter of the bolt at the non-threaded portion that is outside of the annular break groove is smaller than a diameter of the bolt.

13. A method comprising:

providing a blind fastener comprising a nut and a bolt having: (i) a first threaded portion, (ii) a second threaded portion, and a non-threaded portion disposed between the first threaded portion and the second threaded portion and (iii) an annular break groove disposed completely within the non-threaded portion, and wherein the first threaded portion comprises different dimensions than the second threaded portion;

positioning the blind fastener for installation within a work piece and rotating the bolt within the blind fastener until the bolt fractures when the non-threaded portion is exposed and the fastener is installed; and wherein the installed fastener after breaking off the bolt comprises a recess-free, flush surface relative to a surface of the work piece.

14. The method of claim 13, further comprising grasping the first threaded portion and applying force to the first threaded portion until breaking of the bolt.

15. The method of claim 14, further comprising providing a drive nut, wherein the blind fastener further comprises a nut, and wherein the drive nut interfaces with the nut.

16. The method of claim 14, further comprising providing an installation tool comprising a head, wherein the blind fastener further comprises a nut, and wherein the head interfaces with the nut.

* * * * *